April 5, 1927.　　　　　A. J. MICHELIN　　　　　1,623,883
METHOD OF MANUFACTURING SEAMLESS RIMS AND WHEEL DISKS
Filed Nov. 10, 1925　　　6 Sheets-Sheet 1
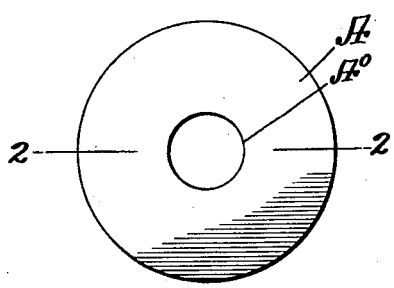
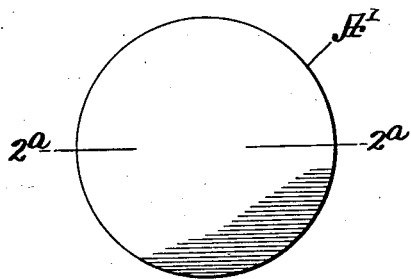
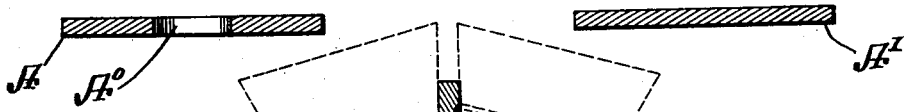
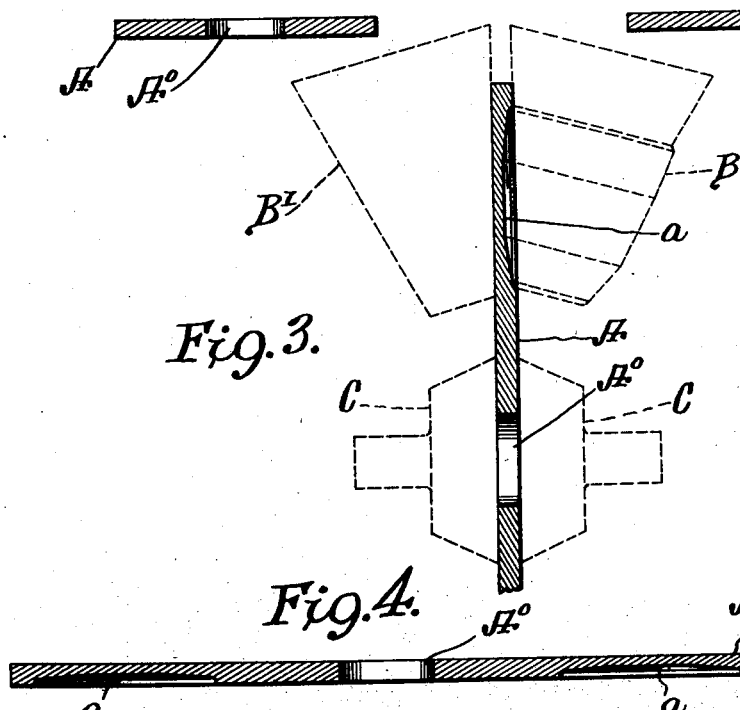
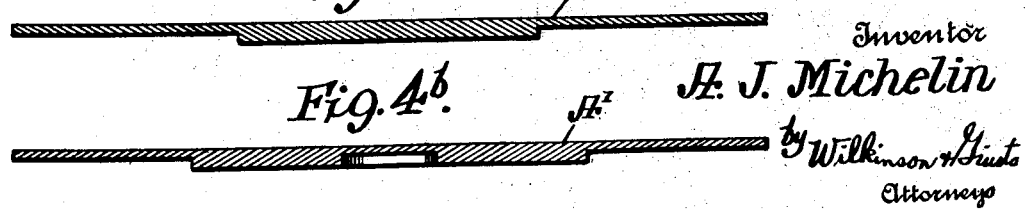
Inventor
A. J. Michelin
by Wilkinson & Giusto
Attorneys April 5, 1927. 1,623,883
A. J. MICHELIN
METHOD OF MANUFACTURING SEAMLESS RIMS AND WHEEL DISKS
Filed Nov. 10, 1925   6 Sheets-Sheet 2

Inventor
A. J. Michelin
by Wilkinson & Giusta
Attorneys

April 5, 1927.

A. J. MICHELIN 1,623,883

METHOD OF MANUFACTURING SEAMLESS RIMS AND WHEEL DISKS

Filed Nov. 10, 1925    6 Sheets-Sheet 3

Inventor
A. J. Michelin
by Wilkinson & Giusta
Attorneys.

April 5, 1927.  A. J. MICHELIN  1,623,883
METHOD OF MANUFACTURING SEAMLESS RIMS AND WHEEL DISKS
Filed Nov. 10. 1925  6 Sheets-Sheet 4

Inventor
A. J. Michelin
by Wilkinson & Fiusta
Attorneys.

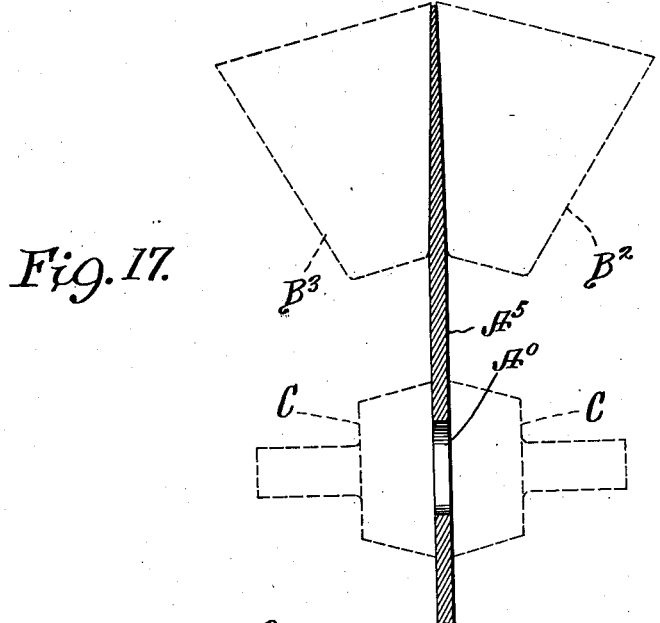
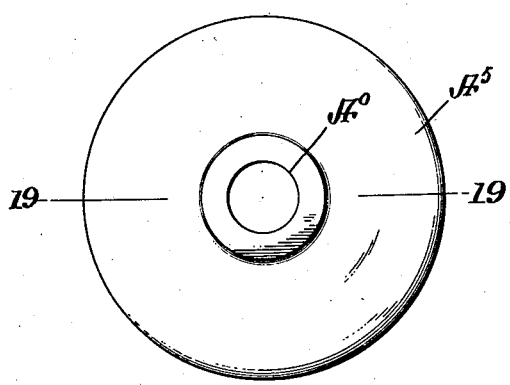
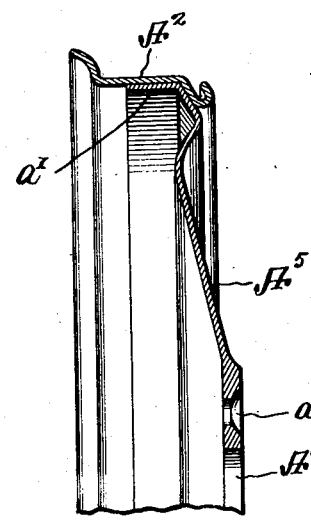
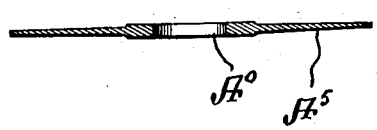

Patented Apr. 5, 1927.

1,623,883

UNITED STATES PATENT OFFICE.

ANDRÉ JULES MICHELIN, OF PARIS, FRANCE.

METHOD OF MANUFACTURING SEAMLESS RIMS AND WHEEL DISKS.

Application filed November 10, 1925, Serial No. 68,134, and in France (provisional) August 17, 1925.

My present invention relates to a method of making seamless rims for use on vehicle wheels.

According to my invention, the material is secured in the form of a sheet metal disk of less diameter than either the rim, which is subsequently made from the periphery thereof, or of the wheel body cut from the central portion of the disk after treatment by mechanical processes, as will be hereinafter described. This disk may be either solid or centrally perforated, as desired, and this disk is subjected either hot or cold to a series of mechanical processes, as will be hereinafter described, until the outer portion thereof is in such shape that it can be readily formed into a seamless rim, as will be hereinafter described in detail. The central portion, not needed in forming the rim, is removed and may be converted into a disk suitable for use as a connector between the hub and the rim of one of the well known Michelin disk wheels, such for instance as are shown in my U. S. Patent No. 1,376,390, granted April 26, 1921, and entitled Demountable wheel; or in my U. S. Patent No. 1,413,051, granted April 18, 1922, and entitled Method of manufacturing vehicle wheels; or in my U. S. Patent No. 1,439,571, granted December 19, 1922, and entitled Brake drum.

My invention will be more fully understood after reference to the accompanying drawings, in which the several steps of the method of manufacture are illustrated, and in which:

Fig. 1 is a plan view of the sheet metal blank in the form of a perforated disk, adapted for use in the manufacture of the rim and wheel disk hereinafter described;

Fig. 1ª shows a similar view of a solid sheet metal disk adapted for use in carrying out my improved method;

Figs. 2 and 2ª show respectively sections along the lines 2—2 and 2ª—2ª of Figs. 1 and 1ª;

Fig. 3 shows the disk on a larger scale, after its contour has been altered by rolling, the rolls being indicated in dotted lines;

Fig. 4 shows the disk of Fig. 3 after it has been removed from the rollers;

Fig. 4ª is a similar view of the disk shown in Fig. 1ª after its cross-section has been altered as shown, by rolling;

Fig. 4ᵇ shows the disk of Fig. 1ª further altered in cross-section by mechanical treatment.

Figure 5:
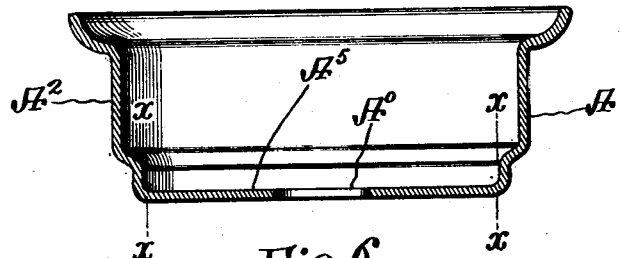
Figure 6:
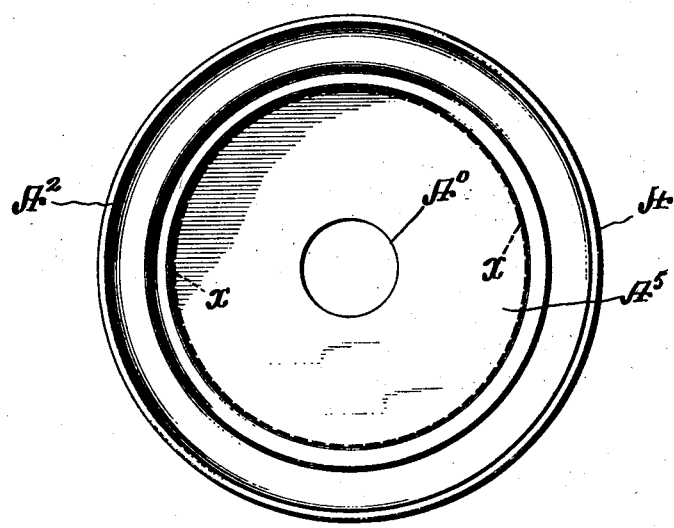
Figure 7:
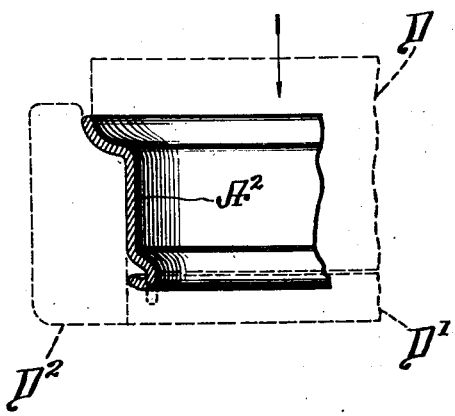
Figure 8:
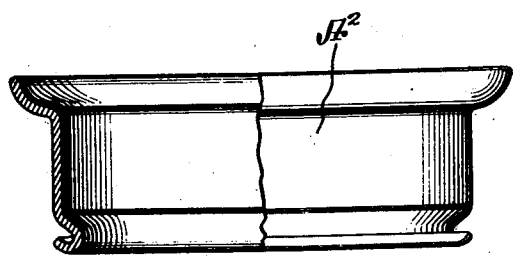
Figure 9:
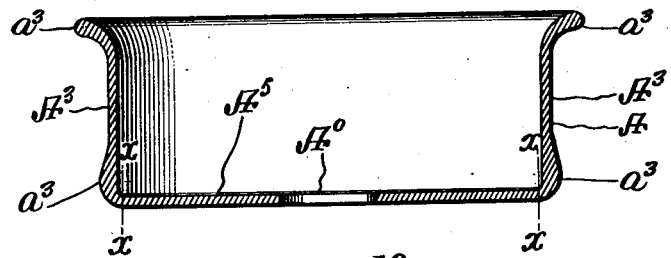
Figure 10:
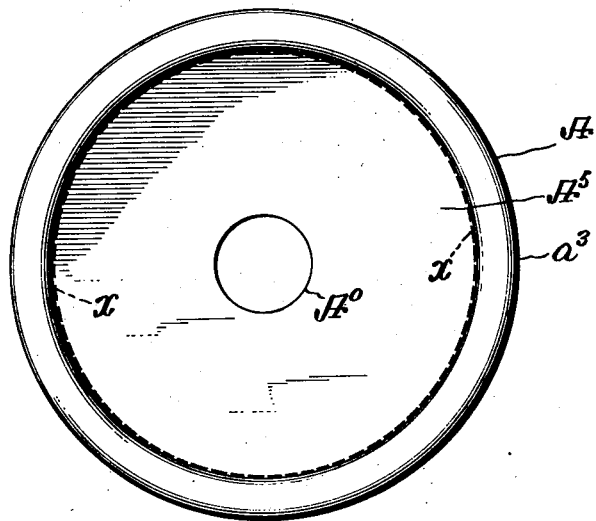
Figure 11:
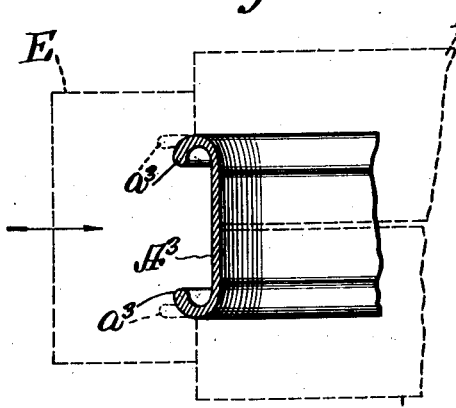
Figure 12:
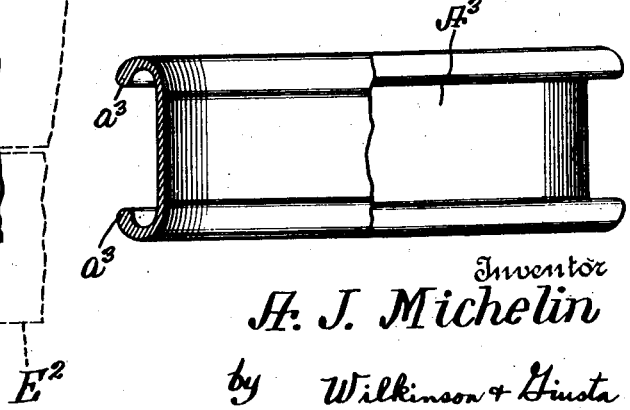
Figure 13:
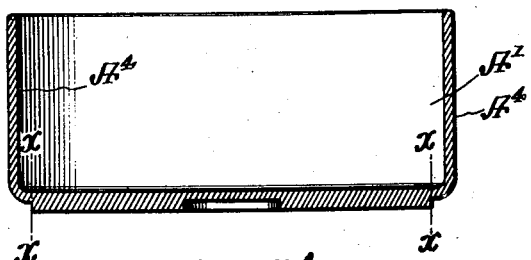
Figure 15:
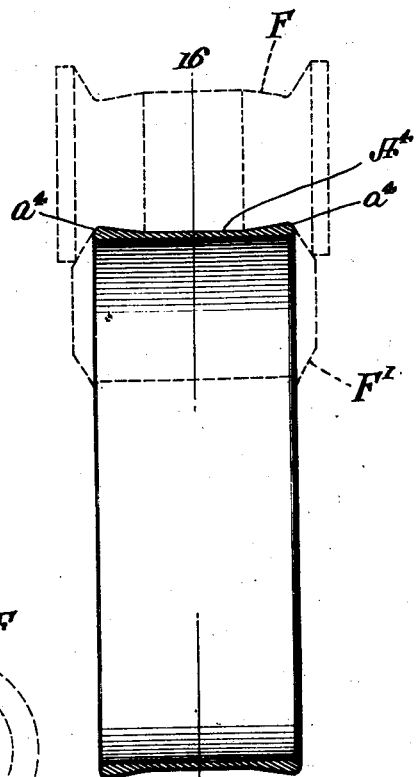
Figure 14:
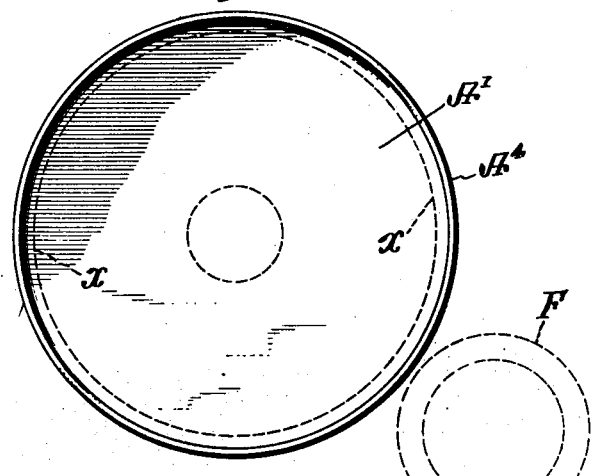
Figure 16:
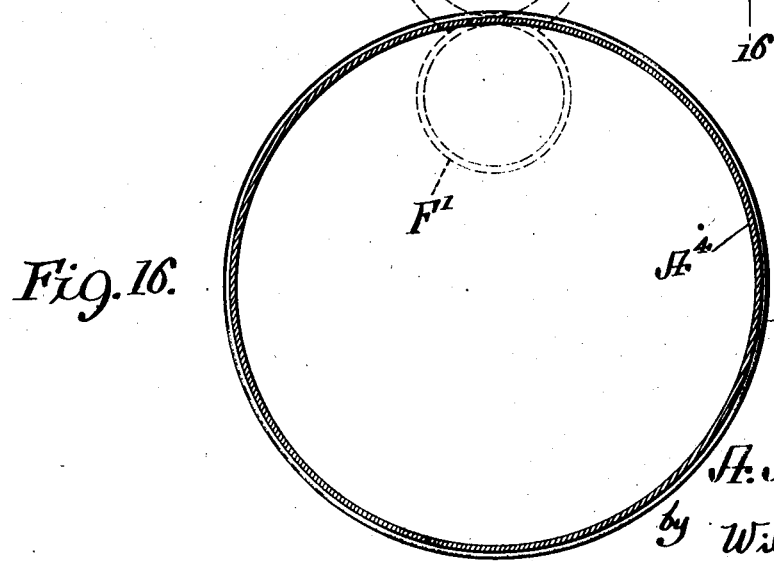
Figure 21:
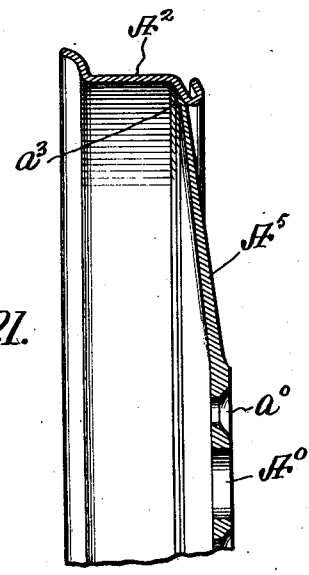
Figure 22:
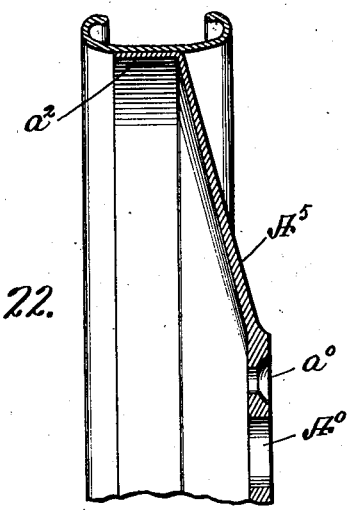
Figure 24:
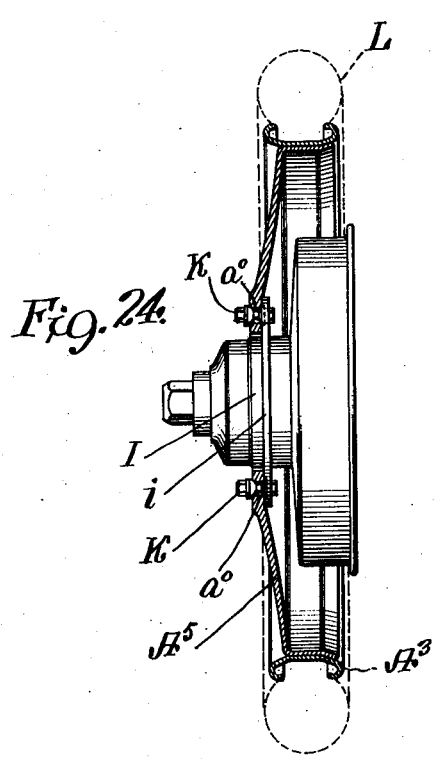
Figure 23:
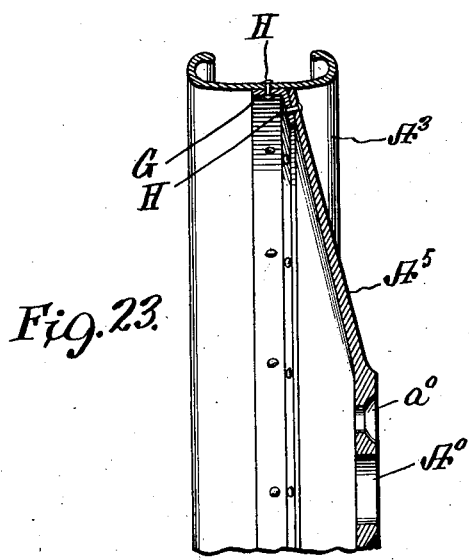

Fig. 5 shows a cross-section of the disk shown in Fig. 1, after it has been cupped and shaped to form one type of rim, and before the central disk is removed;

Fig. 6 is a plan view of the shaped blank as shown in Fig. 5, and illustrates the parts to be removed before the seamless rim is formed;

Fig. 7 shows diagrammatically the outer portion of the blank shown in Figs. 5 and 6 subjected to the final shaping treatment;

Fig. 8 is a sectional elevation showing the rim of Fig. 7 detached from the shaping apparatus;

Fig. 9 shows the blank of Fig. 1, but shaped to a different contour, adapted to form a seamless rim of a different cross-section from that shown in Figs. 5 to 8;

Fig. 10 is a plan view of the blank shown in Fig. 9, and indicating the part to be removed;

Fig. 11 shows diagrammatically the method of forming the outer band cut from Fig. 9 into a seamless rim;

Fig. 12 shows a sectional elevation of a complete seamless rim shaped according to Figs. 9 to 11;

Fig. 13 shows the blank of Fig. 4ᵇ developed into a cup-shaped form, incident to the manufacture of still another form of seamless rim;

Fig. 14 is a plan view of the construction shown in Fig. 13, indicating the part to be removed;

Fig. 15 shows diagrammatically the cylindrical band removed from Fig. 13, being further shaped between rollers;

Fig. 16 shows diagrammatically a section along the line 16—16 of Fig. 15;

Fig. 17 shows the subsequent treatment of the central disk after it has been removed from the blank in the process of being rolled into a wheel disk;

Fig. 18 is a side elevation on a smaller scale;

Fig. 19 shows a section along the line 19—19 of Fig. 18, showing the wheel disk after it has been rolled and before it has been shaped to its final form for use on the wheel;

Fig. 20 is a sectional elevation showing the disk of Fig. 18, shaped to be assembled as by welding with the rim shown in Fig. 7;

Fig. 21 is a similar view showing another form of wheel disk connected to the rim of Fig. 7, as by welding;

Fig. 22 is a similar view showing still another form of wheel disk flanged to be connected as by welding with the seamless rim shown in Fig. 12;

Fig. 23 is a similar view showing another form of wheel disk connected to the rim by intermediate members, such as an annular angle iron and rivets; and Fig. 24 shows a complete wheel with the wheel disk connecting the hub and the rim, and the tire being indicated in dotted lines.

The method of constructing the seamless rim from the disk will be the same whether the disk A is centrally perforated, as shown at $A^0$ in Figs. 1 and 2, or whether it is solid as shown at $A'$ in Figs. $1^a$ and $2^a$, and the hereinafter described series or steps will be generally similar for either form of blank, but where it is desired to carry out the ancillary method of forming a wheel disk from the same blank as a seamless disk, it will be more convenient to start with the centrally perforated blank, as shown in Figs. 1 and 2.

Such a blank is shown diagrammatically under treatment in Fig. 3, where it is being rolled between the shaping roller B and the conical roller $B'$, the blank A being clamped between the jaws of the rotary chuck C, shown diagrammatically in Fig. 3. During this rolling, the diameter of the blank A is increased, its walls are made thin, and it is provided with an annular groove $a$ of a shape corresponding to the contour of the shaping roller B.

After being rolled to the desired shape, as shown in Fig. 4, the blank is cupped by pressure along the axis of the rim between dies of suitable form, until the desired cross-section is secured, such for instance as $A^2$ shown in Fig. 5. The side walls of the cup are now in such shape to be conveniently converted into a seamless rim, and the central portion is removed by shearing, punching or cutting along the line $x-x$ of Fig. 5 or the dotted circle $x-x$ of Fig. 6. After the central portion is removed it may be subsequently treated, as hereinafter described. The annular band of irregular cross-section may then be shaped to the desired cross-section shown in Figs. 7 and 8 by a press of suitable contour, such for instance the plunger D, the block $D'$ and the sleeve $D^2$, shown in Fig. 7.

After being so shaped, the rim may be removed from the apparatus and becomes one of the well known types of rim. The rim may be used as it comes from the apparatus, without further treatment, or if desired, it may be burnished or polished or trimmed up with suitable tools, according to such requirements as may exist.

Such a rim is shown assembled with the wheel disc in Figs. 20 and 21.

The manufacture of a rim of the clincher type is illustrated in Figs. 9 to 12, in which the blank is cupped preferably by press-forging, to the shape shown in Fig. 9, and the edges of the side walls $A^3$ are preferably thickened somewhat, as at $a^3$ incident to the process of manufacture. The bottom of the cup is cut out along the line $x-x$ of Fig. 9 or the dotted circle $x-x$ of Fig. 10, leaving the disk $A^5$ and the annular band $A^3$, the latter being of substantially cylindrical form. This annular band may then be shaped to the clincher type by radial compression as by the plunger E forced in the direction of the arrow towards the grooved dies $E'$ and $E^2$, as shown in Fig. 11.

When the complete rim has been so formed, it is taken out of the press and becomes a complete seamless rim, as shown in Fig. 12. This rim may be used without further alteration, or it may be polished or burnished or otherwise treated before or after being mounted on the wheel.

In the arrangement shown in Fig. 13, the solid disk having been rolled or stamped to the shape shown in Fig. $4^b$, it is cupped so that the side walls $A^4$ are substantially cylindrical. This cupping may be conveniently done by press-forging; and when so cupped the bottom portion is cut away along the lines $x-x$ of Fig. 13 or the dotted circle $x-x$ of Fig. 14 and the removed portion may be treated separately, as hereinafter described. The side walls then constitute an annular band, which may be bent directly to the desired shape in any convenient way, or the profile of this band may be altered, as by rolling between rollers F and $F'$, as shown in Figs. 15 and 16, in which case the edges of the annular band are thickened, as at $a^4$. This band may then be shaped to form the complete seamless rim, such for instance as that shown in Fig. 12, following the methods already described with reference to Figs. 9 to 12; or any other desired profile in cross-section may be imparted to the seamless rim by the mechanical processes herein described.

In the manufacture of the seamless rim, as just described, the profile of the cross-section of the rim may obviously be varied and the thickness of the walls at various points may also be varied by well-known mechanical processes, such as stamping, press-forging, rolling, or cutting. The rim as herein described may ordinarily be used after the process is complete without extra work thereon, but whenever special finish is desired, obviously the same may be applied by the use of well-known buffing or burnishing or cutting tools.

While I have shown various profiles of rim in cross-section, obviously these may be varied within limits by changing of the tools or the process involved, and I do not mean to limit the invention to any such details except as particularly pointed out in the claims.

The complete rim as hereinbefore described may be bolted or welded or otherwise attached to the wheel body, and such mode of attachment is not a part of my present invention.

It will be noted that in the manufacture of the seamless rim, as hereinbefore described, the circumferential portion only of the blank is used, and the central portion is either stamped or sheared or removed therefrom in any convenient way. While this central portion may be used for various purposes, it is especially adapted for use in the manufacture of the webs or disks of disk wheels, such as are illustrated and described in my patents aforesaid or illustrated and described and claimed in my pending applications, Serial Nos. 374,505 and 374,506, both filed April 16, 1920, and both entitled Improvements in vehicle wheels.

The manufacture of such webs or disks as ancillary to the principal invention, the manufacture of seamless rims, will now be described.

Assuming the central portion $A^5$ to have been cut out of the blank after it has been shaped, for instance as shown in Figs. 5 and 9, incident to the manufacture of the seamless rim, this central portion will also be in the form of a perforated disk, and it is rolled between conical rollers $B^2$ and $B^3$, as shown in Fig. 17, to the form shown in Figs. 18 and 19. It is then preferably dished, as shown in Figs. 20 to 24, and bolt holes $a^6$ are provided in the thicker central portion, so as to secure the same to the hub of the wheel. The outer edge of this web may be cupped, as shown at $a'$ in Fig. 20 or at $a^2$ in Fig. 22, and secured to the rim in any convenient way as by welding; or the outer edge of the web may be secured directly to the rim, as by welding, and without any cupping, as shown at $a^3$ in Fig. 21, or the web and the rim may be connected together by some intermediate means, such as the ring G made in cross-section in the form of an angle-iron and the bolts H, as shown in Fig. 23.

When the web and the rim are so connected together, the tire L may be applied as shown in Fig. 24, and the web connected to the flange $i$ of the hub I of the wheel, as by means of the bolts K, as shown in Fig. 24.

Thus, it will be seen that out of a single blank of sheet metal I may manufacture both a seamless rim and a web, which connects the rim to the hub of the wheel, the two together constituting portions of the well-known Michelin disk wheels.

While I have illustrated and described the seamless rim as connected to the web of a disk wheel, it will be obvious that the seamless rim may be used with other types of wheels, such as wheels with wooden spokes or wire spokes, and it will be seen that the rim may be attached to the wheel in any desired way, and I do not mean to limit the invention to such details.

In the claims I intend the term "mechanical processes" to cover forging, hammering, rolling, punching, drawing, shearing, cutting, or the like, or any one or more of these, where the operation is performed mainly by power-operated machinery.

I also mean by the term "malleable metal," as used in the claims, any metal or alloy which may be rolled, drawn, or forged, or similarly worked or wrought.

In carrying out the herein-described method, the various mechanical processes, or each of them, may be carried out while the blank is either hot or cold.

Having thus described my invention, what I claim and desire to secure by Letters Patent of the United States is:

1. The method of manufacturing from a single blank of resilient metal, both a seamless weldless metallic rim and a wheel disk, the two being adapted to be joined together to form a resilient wheel body for use on automobiles, which consists in preparing a disk of malleable metal of smaller radial diameter than the finished wheel body, subjecting this disk to mechanical processes so as to form a peripheral flanged portion and a central web, separating said central web from said peripheral portion, shaping by mechanical processes the peripheral portion to form an annular weldless rim of the desired cross-sectional profile adapted to receive and hold a pneumatic tire, and forming by mechanical processes from said central web, a dished resilient wheel disk with a thickened hub-engaging portion, tapering outwards towards the periphery.

2. The method of manufacturing from a single blank of resilient metal, both a seamless weldless metallic rim and a wheel disk, the two being adapted to be joined together to form a resilient wheel body for use on automobiles, which consists in preparing a disk of malleable metal of smaller radial diameter than the finished wheel body, subjecting this disk to mechanical processes so as to form a cup-shaped body having a peripheral flanged portion and a central web, separating said central web from said peripheral portion, shaping by mechanical processes the peripheral portion to form an annular weldless rim of the desired cross-sectional profile adapted to receive and hold a pneumatic tire, and forming by mechanical processes from said central web, a dished resilient wheel disk.

ANDRÉ JULES MICHELIN.